United States Patent [19]

Nilsson et al.

[11] 4,434,756
[45] Mar. 6, 1984

[54] ARRANGEMENT FOR BEARING OF A CRANKSHAFT

[75] Inventors: Ralph L. Nilsson, Hindas; Bo R. Rangert, Mölnlycke, both of Sweden

[73] Assignee: EMAB Electrolux Motor Aktiebolag, Huskvarna, Sweden

[21] Appl. No.: 381,737

[22] Filed: May 24, 1982

[30] Foreign Application Priority Data

Jun. 16, 1981 [SE]  Sweden ................................ 8103766

[51] Int. Cl.³ ............................................. F16C 27/00
[52] U.S. Cl. ................................... 123/195 R; 384/297
[58] Field of Search ..................... 123/195 R, 195 C; 308/179, 184 R, 189 R, 236, 238, DIG. 8; 384/297

[56] References Cited

U.S. PATENT DOCUMENTS

| | | | |
|---|---|---|---|
| 2,969,779 | 1/1961 | Hauser | 123/195 R |
| 3,698,370 | 10/1972 | Haldeman et al. | 123/193 C |
| 3,926,485 | 12/1975 | Frost et al. | 308/189 R |
| 3,936,099 | 2/1976 | Braun et al. | 308/DIG. 8 |
| 4,198,947 | 4/1980 | Rassey | 123/195 R |

*Primary Examiner*—William A. Cuchlinski, Jr.
*Attorney, Agent, or Firm*—Alfred E. Miller

[57] ABSTRACT

The bearings of the crankshaft of an internal combustion engine are surrounded by rings of a high temperature resistant polymer, the rings being pressed into bearing seats in the upper and lower portions of the crankcase, the rings being formed with extensions to completely separate the upper and lower portions of the crankcase. The rings enable the use of plastic materials for the lower crankcase, by insulating the lower portion of the crankcase from heat in the upper portion thereof.

9 Claims, 4 Drawing Figures

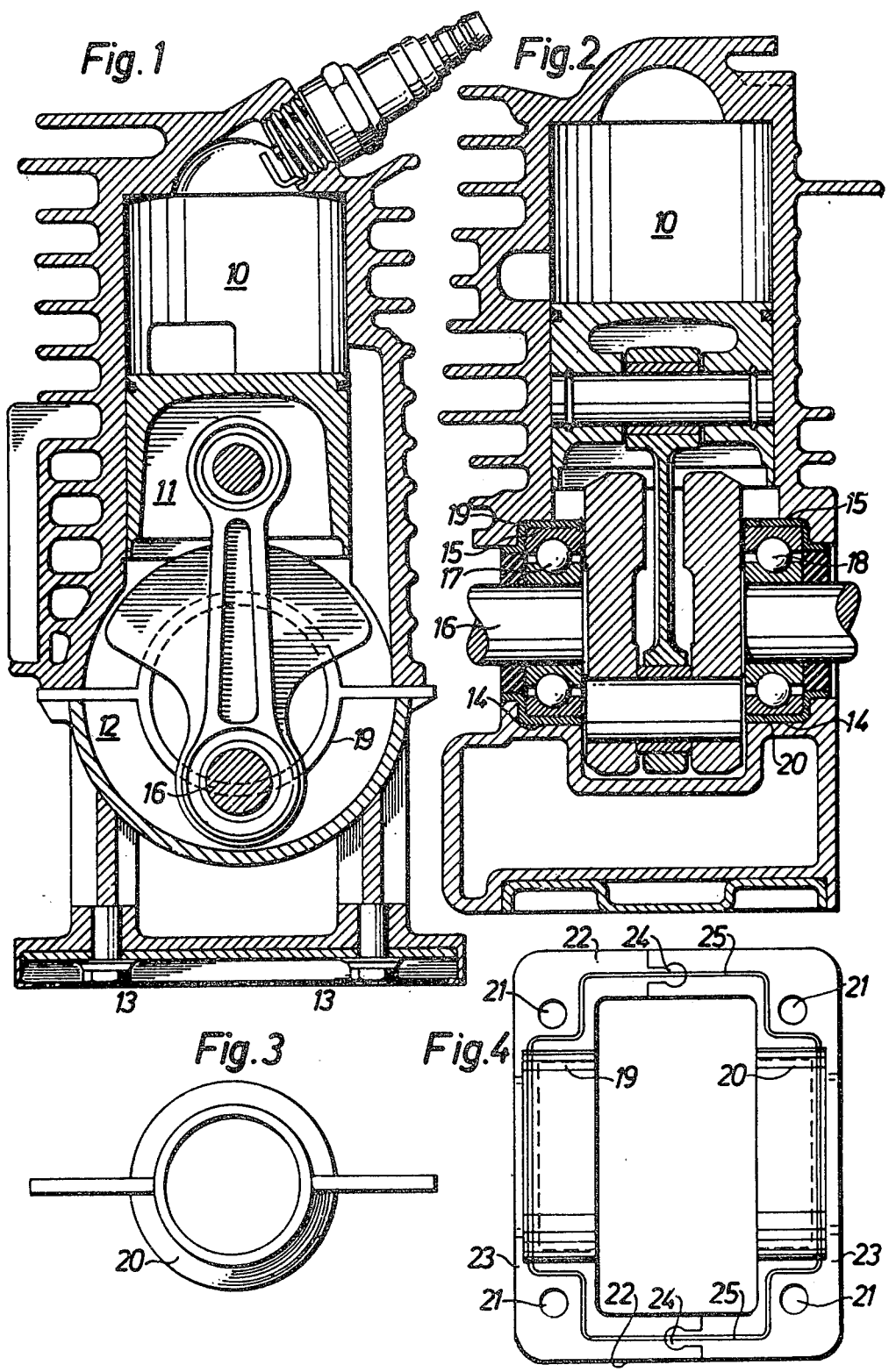

ARRANGEMENT FOR BEARING OF A CRANKSHAFT

This invention relates to an arrangement in a crankshaft of a combustion engine, preferably a two-stroke engine with crankcase compression. It has for an object to provide a separate crankshaft bearing band which encloses the roller bearings without joints.

In the development of light combustion engines for portable tools, such as power saws, new materials within the engine technique have been used, preferably fibre-glass reinforced plastics material. Constructions having a crankcase of plastics material have been tried but difficulties have arisen as concerns the sealing of the joint surfaces of the two parts of the crankshaft bearing seats. Due to the different properties of the materials of the various parts with regard to linear expansion, heat conduction and stiffness, plastics material has so far not been directly applicable to combustion engines. Even if plastics material of refined properties, which would satisfy the requirements, are available, these are not advantageous with regard to costs compared to constructions already available. One solution is however possible if high-quality material is used only in the connection between the cylinder including the crankcase top part on one hand and the bottom part of the crankshaft on the other hand.

The present invention offers a solution for joining a crankcase of plastics material to a cylinder of a metal alloy via a crankshaft bearing sleeve which when mounted encloses the crankshaft bearings without joints and separates the cylinder and the crankcase in the parting plane through the crankshaft. The material of the crankshaft bearing sleeve is selected for example among high-temperature resistant polyester plastics, which both endure the temperature of the cylinder part and limit the heat transfer to the bottom part of the crankcase which is made by a cheaper plastics material. Thus the idea of reducing the manufacturing cost and the weight of the product is realized.

An embodiment of an arrangement according to the invention will now be described with reference to the accompanying drawing in which FIG. 1 shows an engine with the said arrangement in a vertical cross section, FIG. 2 is another cross section perpendicular to the first-mentioned, FIG. 3 is an end view of a crankshaft bearing sleeve and FIG. 4 shows the crankshaft bearing sleeve in a horizontal projection.

As seen in FIGS. 1 and 2, the engine of this embodiment is a two-stroke engine with a cylinder 10, a piston 11 and a crankshaft 12. The cylinder is coupled to the crankcase by four screws 13 passing from below through holes in the crankcase half and are screwed in the cylinder part. The crankcase 12 is produced by pressing and/or injection moulding of thermoplastics and has semi-cylindrical cavities 14 in its upper surface. These cavities correspond to cavities 15 in the cylinder 10. The crankshaft 16 is a through-shaft with a crankshaft bearing in the form of roller bearings 17, 18 in each cavity. Each roller bearing is surrounded by a sleeve 19, 20 which is placed exteriorly on the outer ring of the bearing before the crankshaft is mounted in the crankcase. The sleeves are shown in FIGS. 3 and 4, the four holes 21 indicating the location of the through-passing screws 13. The sleeves are included in a frame with short sides 22 and long sides 23. At the short sides there are connecting means 24 keeping the frame together. Each frame half, however, can be treated separately on mounting on the crankshaft bearings. The frame sides also serve as sealing between the cylinder and the crankcase. The sealing property can be improved by a low ridge 25 on each side surface of the frame. When the crankcase is assembled and the screws 13 are tightened the frame surfaces seal against the relevant surfaces of the parts 10 and 12. The elasticity of the sleeve contributes to filling up of possible unevenness of the cavities when the screws are tightened so that an effective sealing around the bearings is achieved. Therefore, the cavities can be left unfinished such as they appear after moulding because the tolerances already obtained are sufficient for fitting to the sleeve. Thanks to the sleeve also a uniform pressure around the outer bearing ring is obtained and the latter is thus not deformed when the screws are tightened.

The embodiment described should be considered as an example of realization of the invention. It would be evident that parts can be moved, completed, replaced or be differently shaped without deviating from the basic concept of the invention.

We claim:

1. An engine having a cylinder defining the upper portion of a crankcase, a piston reciprocably positioned in the cylinder and coupled to a crankshaft, a separate plastic crankcase lower portion, means for mounting said lower portion below said upper portion, and bearings for the crankshaft held between the upper and lower portions of the crankcase, and sleeve members of high temperature resistant plastic material over said bearings, sandwiched between said bearings and said upper and lower portions and separating said bearings from said upper and lower portions, said upper and lower crankcase portions having bearing seats for receiving said sleeve members, said mounting means pressing said sleeve members into said bearing seats, said sleeve members extending from said bearings to completely separate said crankcase portions.

2. The engine of claim 1 wherein said sleeve members are of a fiber-glass reinforced polyester.

3. The engine of claim 1 wherein said sleeve members form a part of a frame having short and long sides that extend to form a seal throughout the joint between the upper and lower crankcase portions.

4. The engine of claim 3 wherein each of the sleeve members form a separable part of the frame.

5. The engine of claim 3 wherein the sealing surfaces of said frame have ridges abutting the adjacent portions of said upper and lower crankcase portions.

6. The engine of claim 4 wherein the portions of said frame having different ones of said rings are interconnected by hook means.

7. In an internal combustion engine having a cylinder for receiving a reciprocable piston, the cylinder defining an upper crankcase portion, and further comprising a lower crankcase portion, said upper and lower crankcase portions defining bearing seats for seating bearings of a crankcase coupled to said piston, the lower crankcase portion being mounted to the upper crankcase portion and defining a joint there-between; the improvement comprising seal means of a high temperature plastic material in said joint, said seal means having ring-shaped portions surrounding said bearings and fitted between the bearings and the respective bearing seats, and a frame extending from said ring-shaped portions to fill said joint and fully separate said upper and lower crankcase portions, said lower crankcase portion being of a thermoplastic material.

8. The engine of claim 7 wherein said frame has separable portions each joined to a separate one of said ring-shaped portions, the frame portions being interlocked together.

9. The engine of claim 8 wherein said frame has ridges on the surface of the portion thereof engaging said upper and lower crankcase portions.

* * * * *